Patented July 12, 1927.

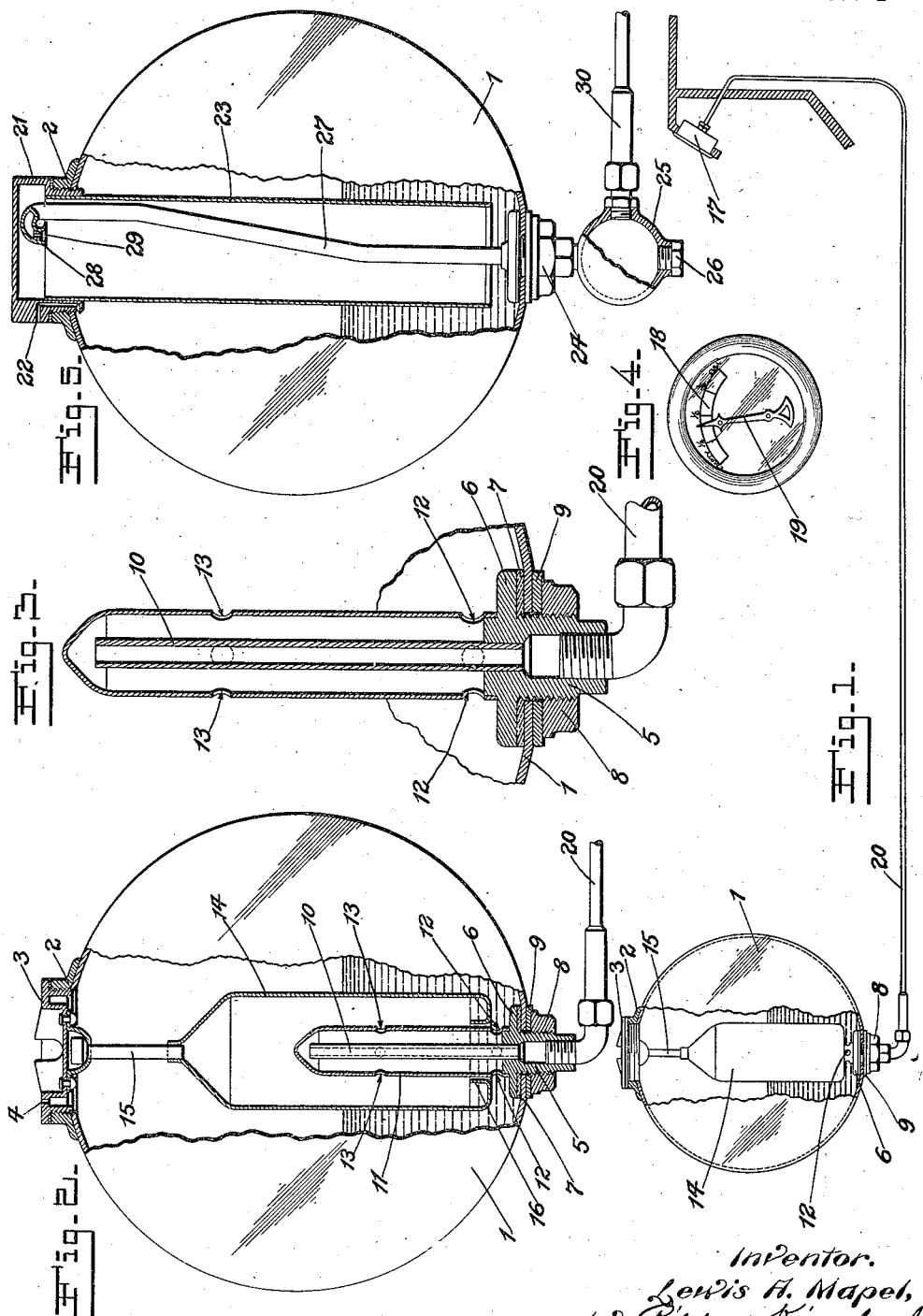

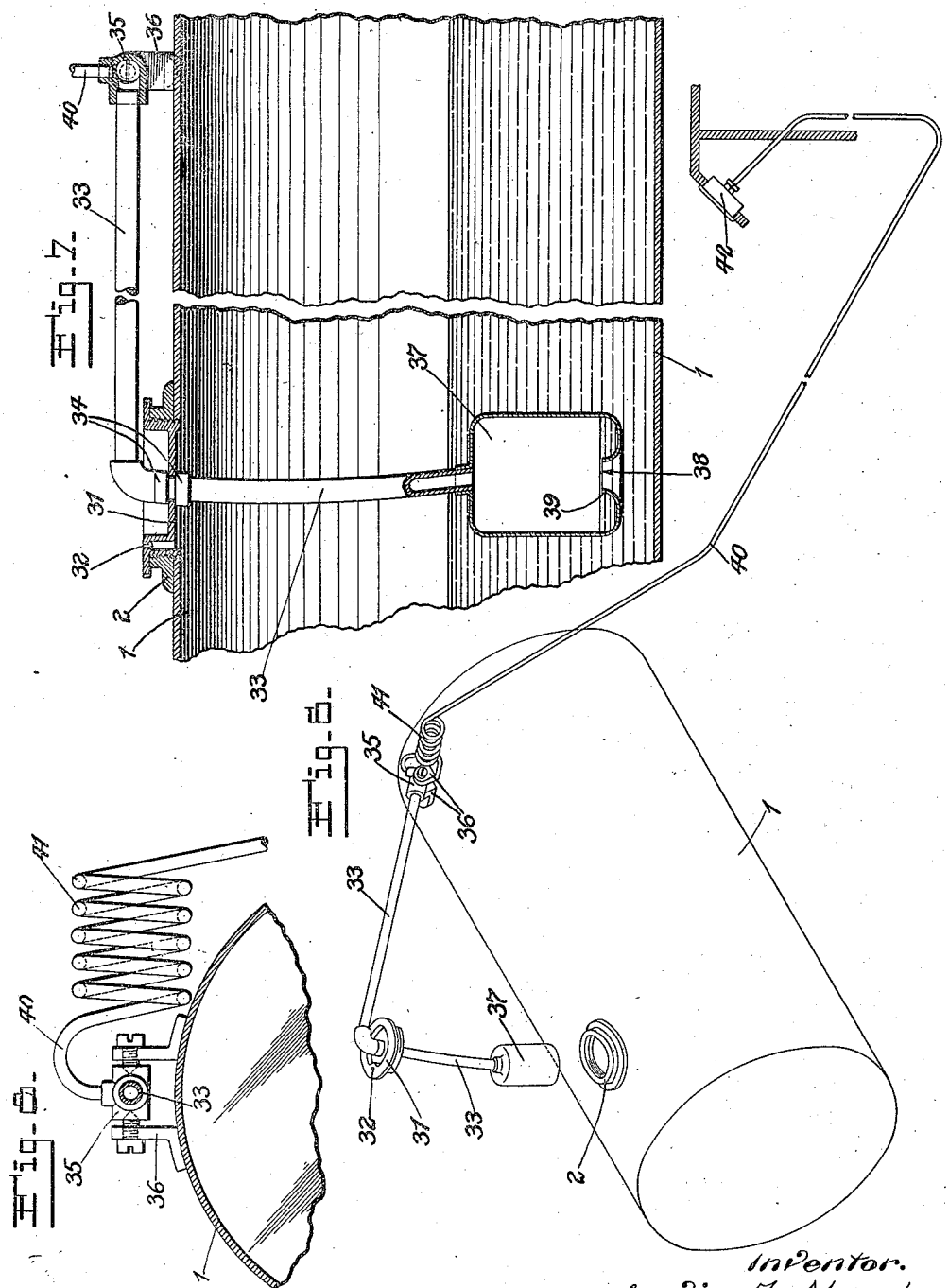

1,635,374

UNITED STATES PATENT OFFICE.

LEWIS A. MAPEL, OF ST. LOUIS, MISSOURI, ASSIGNOR TO THE AUTOMATIC APPLIANCE COMPANY, OF ST. LOUIS, MISSOURI, A CORPORATION OF MISSOURI.

LIQUID-LEVEL INDICATOR.

Application filed June 9, 1921. Serial No. 476,334.

This invention relates to liquid level indicators.

An object of the invention is to provide an improved instrument in which the indicating device is affected through the medium of a confined column of air that is subjected to pressure of liquid in the tank and in which the confined column of air is exposed to atmosphere, as an incident to the filling of the tank with liquid.

Another object of the invention is to provide an instrument of the character mentioned with novel and efficient means for containing a confined column of air to transmit pressure to the indicating device, and for automatically exposing the pressure chamber to atmosphere as an incident to the removal of the closure cap of a liquid fuel tank.

Another object of the invention is to provide novel and efficient means for subjecting the confined column of air to pressure of liquid in a tank, so that the confined column of air will transmit pressure to an indicating device to afford visual indication of the amount of liquid contained in the tank.

Various other objects and numerous advantages will be apparent from the following description, reference being made to the accompanying drawings, in which Fig. 1 is a view diagrammatical in nature, showing one embodiment of the invention applied to an automobile.

Fig. 2 is an enlarged view showing some of the parts in section.

Fig. 3 is a view further enlarged as compared with Fig. 2, showing the source of the confined column of air.

Fig. 4 shows the face of the indicating device.

Fig. 5 is an enlarged view showing a modified or alternative form of the structure in connection with the liquid tank.

Fig. 6 is a view showing a further modification of the invention.

Fig. 7 is a sectional view showing parts in position for use.

Fig. 8 is an enlarged view of a detail of this modified form of the invention.

In the embodiment shown in Figs. 1, 2 and 3, the liquid supply tank 1 has an inlet opening through the top, the border of which is equipped with an internally threaded flange 2. A closure cap 3 is provided for removable application within the hole through the flange 2, the closure cap having exterior threads for engagement with the threads of the flange. An air vent 4 is provided in the cap 3.

A fitting member is secured within a hole in the bottom of the tank, said member comprising a tubular part 5 extending through the hole in the tank wall and a circumferential flange 6 within the tank, pressing upon a packing washer 7. A nut 8 is threaded upon the outer end of the tubular portion 5 of the fitting member, clamping upon a washer 9 to secure the fitting member in rigid position.

A tube 10 extends upwardly from the fitting member within the tank and is enclosed within a cap or housing 11 having a number of holes 12 near its lower end and a number of holes 13 a considerable distance below the closed upper end of said cap or housing and below the open upper end of the tube 10. A chamber 14 has a connection 15 by which it is pivotally supported from the cap 3. The chamber 14 is small enough to pass readily through the opening closed by the cap 3 when said cap is withdrawn. The upper end wall of the chamber 14 is preferably conical to facilitate withdrawal thereof from the tank. The lower end wall of the chamber 14 is provided with a central opening to receive the cap or housing 11, said opening being of somewhat larger diameter than the diameter of the cap or housing 11. The opening to the lower end of the chamber 14 is bordered by a flange 16 extending a short distance upwardly within the chamber. By reference to Fig. 1 it will be seen that when the closure cap 3 is in position, the lower end of the chamber 14 is above the holes 12 and a considerable distance below the holes 13.

The indicating device 17 is mounted in a position convenient for observation; and in case the invention is used upon an automobile, it is preferably mounted upon the instrument board. The indicating device comprises a graduated scale 18, and a pointer 19 arranged to respond to pressure transmitted to the indicating device through a tube 20 connecting the indicating device with the fitting member 5—6. Thus, the confined column of air is provided from the tank 1 to the indicating device, and this confined column of air is subjected to pressure of liquid within the liquid tank. When the chamber 14 is withdrawn from the tank in order to permit the tank to be filled with liquid, or for any other purpose, said chamber is necessarily placed in communication with atmosphere. So, also, if the level of the liquid in the tank is below the holes 13 in the housing 11, the source of the confined column of air will likewise be placed in communication with atmosphere.

In the modification shown in Fig. 5, the liquid supply tank 1 has the liquid supply opening in its top bordered by the internally threaded flange 2. Within the hole in the flange 2 a fitting member is located, the same comprising a cap 21 having a portion threaded exteriorly for engagement with the threads of the flange 2. The cap 21 extends above the flange 2 and is hollow inside. The cap is provided with an air vent 22 for the admission of air into the tank but said air vent will not communicate with the hollow interior. A tube 23, supported by the cap 21, extends downwardly within the tank to a point near the bottom of the tank. Said tube 23 and cap 21 form an air chamber, which when inserted in the liquid within the tank, traps the air within said chamber.

Obviously the air within said chamber thus provided is compressed by the weight of the gasoline acting upon it. For example, the level of the gasoline within the tube 23 comes only to a point slightly above the lower open end of said chamber, the remaining area of the chamber containing air under pressure corresponding to the height of the gasoline within the tank.

A fitting member 24 is inserted in the bottom of the tank 1 in a manner to prevent leakage. A trap 25 is connected with the fitting member 24 and provided with a removable drain plug 26. The tube 27 rises from the fitting member 24 within the tank to a point above the top of the tank. The upper end of the tube 27 is provided with a downwardly turned portion 28 for the purpose of shedding liquid when the tank is filled, the liquid being thereby prevented from entering the tube. Within said tube 27 at an appropriate distance above the level of the flange 2, there is a constriction 29, which prevents liquid from entering the tube should the tank be filled to overflowing. However, the end of the tube 27 is open to allow communication between the tube 23 and the interior of said tube 27.

From the trap 25, the tube 30, like the tube 20, leads to the indicating device.

In the modification shown on Sheet 2 of the drawings, the liquid supply tank 1 has a liquid supply opening in its top, bordered by the internally threaded flange 2. The closure cap 31 for the liquid supply opening is threaded exteriorly for engagement with the threads of the flange 2 and is provided with an air vent 32 for the admission of air into the tank. An appropriately formed tube 33 extends through a hole in the cap 31, the cap being capable of rotation around the tube. As shown, the wall of the cap is between the collars 34 on the tube, so that when the cap is secured within the supply opening, the tube will be held down within the liquid tank (Fig. 7); and when the cap is released, the tube may be withdrawn from the tank and will support the cap, as shown in Fig. 6. The tube 33 has one end provided with a fitting 35 pivoted to a support 36 on the tank, or elsewhere as desired. The end of the tube 33 that extends down within the tank 1 is provided with a pressure chamber 37 having an opening 38 through the bottom wall thereof, bordered by a flange 39 extending upwardly into said chamber.

A tube 40, having a number of coils 41 near its rear end, leads from the fitting 35 to an indicating device 42, supported in a position convenient for observation as, for instance, on the instrument board of an automobile. When the tube 35 and the chamber 37 are immersed in the liquid within the tank, the air within said chamber and within said tube is compressed by the weight of the gasoline acting upon it. For example, the level of the gasoline within the chamber 37 comes only to a point slightly above the edge of the flange 39, the remaining area of the chamber containing air under pressure corresponding to the height of the gasoline within the tank. Such pressure is transmitted to the indicating device 42 through the confined column of air in the tubes 33 and 40, thus causing the indicating device to indicate the amount of gasoline within the tank.

The installation and operation of the equipment shown in Figs. 1 to 4 is as follows—

The hole in the bottom of the tank for the fitting 5—6 is formed in axial alinement with the supply opening at the top of the tank. The fitting 5—6 with the packing washer 7 thereon and the cap or housing 11, secured thereto, is passed through the supply opening and inserted in the hole formed through the bottom of the tank. The fitting is secured in position by the application of the nut 8 and washer 9, and is connected with the indicating device on the instrument board, or elsewhere as desired, by the tube 20 and the elbow in connection therewith which provides a confined column of air from the equipment in connection with the tank to the indicating device. The tank is then filled with liquid which rises within the cap or housing 11 to the upper walls of the holes 13, the closed upper portion of the cap or housing 11 being filled with a confined column of air that is subjected to pressure by the liquid in the tank. Since the upper end of the tube 10 is in open communication with the confined air in the cap or housing 11, it follows that there is a confined column of air from the tank equipment to the indicating device, and that such confined column of air is subjected to pressure by liquid in the tank. For convenience in filling, the indicating device may be provided with a double scale, one of which shows the actual amount of gasoline in the tank, and the other of which shows only the amount above the holes 13 and is used for observing the progress in filling the tank only. The compression chamber which is in connection with part 15, having been secured to the closure cap 3 by the swivel connection mentioned, is passed through the supply opening and is forced into the liquid, the cap or housing 11 passing through the opening in the bottom wall of said chamber. The closure cap is secured to position in the usual way. As the pressure chamber is forced down into the liquid around the cap or housing 11, liquid which has risen in the cap or housing to the top of the holes 13, as stated, is forced out of the cap or housing through the holes 12, leaving the pressure chamber 14 and the cap 11 filled with air that is subjected to pressure by the liquid in the tank. The hole through the bottom wall of the pressure chamber 14 is of slightly larger diameter than the diameter of the cap 11, permitting pressure of the liquid to act upon the air within the pressure chamber as well as upon the air in the cap 11 which is in direct communication with the open upper end of the tube 10. This action of forcing the liquid out of the cap 11 results in uniting the two units 11 and 14 into a single pressure chamber. Liquid will enter the lower end of the chamber 14 and the lower end of the cap 11 in proportion to the head of the liquid in the tank, thus subjecting the confined column of air in the indicating device to pressure in proportion to the head of liquid in the tank and causing the indicating device to indicate such head. The flange 16 around the hole in the bottom of the chamber 14 causes a liquid seal to be formed for preventing exit of air from the chamber 14, due to road vibrations or angularity of the tank.

The installation and operation of the equipment shown in Fig. 5 is generally the same as that described above. A hole is similarly formed in the bottom of the tank and the fitting 24 is applied as described. The trap 25 is then connected to the fitting 24, after which the tube 30 from the indicating device is connected with the trap to form a confined column of air from the tank equipment to the indicating device. The tube 27 with the downwardly turned end 28 having the constriction 29 therein is attached to the fitting 24 before the fitting is secured in place. After these parts have been placed in position, the tank is filled with liquid which cannot pass into the tube 27 because said tube has its upper end above the plane of the flange 2, as described, and further because of the constriction 29 and the resistance of the confined air within the tube. After the tank has been filled, the closure cap 21 with the pressure chamber 23 in connection therewith is secured in place, the pressure chamber being forced down into the liquid around the tube 27. The pressure chamber being air-tight, it is apparent that the air within the chamber is subjected to pressure by the liquid in the tank in proportion to the head of such liquid. Since the pressure chamber 23 is in direct communication with the confined column of air within the tubes 27 and 30, it is apparent that such confined column of air is subjected to the same pressure, thereby causing the indicating device to indicate the head of the liquid in the tank causing such pressure. The vent 22, similar to the vent 4, provides means for the admission of air into the tank for a well understood purpose. It is clear that as the pressure chamber 23 is forced into its place, the liquid that has immersed the tube 27 is displaced, leaving the air within the chamber 23 surrounding said tube and subjected to pressure by the head of liquid in the tank.

The installation of the equipment shown on Sheet 2 of the drawings comprises the provision of an appropriate support such as 36 for pivotally supporting the fitting 35. The end of one arm of the angular tube 33 is secured to the fitting 35, the other arm of said tube passing through and having swivel connection with the closure cap 31, as described. This permits the closure cap to be turned for removal or attachment without interference by the tube in connection therewith. The lower end of the arm that passes through the closure cap opens into the pressure chamber 37 that is united with said arm. The fitting 35 is connected with the coiled end 41 of the tube 40, leading to the indicating device 42, thus providing a continuous confined column of air from the pressure chamber 37 to said indicating device, when the pressure chamber is immersed in the liquid in the tank. This immersion subjects the confined column of air to pressure by the head of liquid in the tank, thus causing the indicating device to respond to such head. After the equipment has been properly mounted and the tank has been filled with liquid, the pressure chamber 37 is forced down into the liquid in the tank and the closure cap is secured in place, thereby subjecting the confined air to pressure by the head of liquid contained in the tank. Said pressure is exerted through the hole 38 in the bottom of the pressure chamber. Liquid will be forced through the hole 38 in proportion to the head of the liquid in the tank, thus subjecting the confined column of air to pressure in proportion to the head. The flange 39 around the hole 38 forms a seal preventing exit of air from the pressure chamber, due to vibrations or angularity of the tank.

From the foregoing it is apparent that in each form of the invention the pressure chambers are exposed to atomsphere periodically whenever it is desired to fill the tank. It is also seen that this exposing of the pressure chambers to atmosphere when it is desired to fill the tank occurs automatically as an incident to the removal of the seal cap. This overcomes the necessity of the operator giving any attention to the draining of the pressure chambers which is necessary in other types of gages. Periodic exposure of the pressure chambers to atmosphere prevents the encroaching of the gasoline upon the air within the chamber and this encroachment is the cause of the indicating device giving a false indication of the gasoline in the tank. By elimination, therefore, of this encroachment, the indicating device will give the proper indication without any attention at all from the operator.

What I claim and desire to secure by Letters Patent is:—

1. The combination with a tank from which liquid is to be withdrawn and provided with a filling opening, of an element adapted for manipulation dependently and as an incident to the filling of the tank, a pressure chamber in which air is normally confined by said liquid, an indicating device communicating with said chamber and responsive to the varying head of said liquid, and means operatively connected with said element and cooperating with said chamber when the element is manipulated to expose said chamber to the atmosphere.

2. The combination witih a tank from which liquid is to be withdrawn and having a filling opening provided with a closure, of a pressure chamber in which air is normally confined by said liquid, an indicating device communicating with said chamber and responsive to the varying head of said liquid, and an operative connection between said chamber and said closure, whereby upon removal of said closure said chamber is automatically exposed to the atmosphere.

3. The combination with a tank from which liquid is to be withdrawn and having a filling opening provided with a closure, of a pressure chamber in which air is normally confined by said liquid, an indicating device communicating with said chamber and responsive to the varying head of said liquid, and means cooperating with said closure and said chamber to so position the chamber as to maintain the air confined therein when said closure is in place but adapted to automatically expose said chamber to the atmosphere when said closure is manipulated to uncover the tank opening.

4. The combination with a tank from which liquid is to be withdrawn and having a filling opening, of a pressure chamber in which air is normally confined by said liquid, an indicating device communicating with said chamber and responsive to the varying head of said liquid, and a closure having connection to said chamber, and adapted when in closed position to hold said chamber in place in the liquid and adapted when opened to automatically retract said chamber and expose it to the atmosphere.

5. The combination with a tank from which liquid is to be withdrawn and provided with a filling opening, of an indicating device, means for causing said device to initally respond to a part of the varying head of said liquid, and means cooperating with said last means for causing said device to finally respond to the entire varying head of said liquid.

6. The combination with a tank from which liquid is to be withdrawn and provided with a filling opening, of an indicating device, means for causing said device to respond to the varying head of said liquid above a predetermined minimum while the tank is being filled, and means cooperating with said last means for causing said device to respond also to the varying head of said liquid below said minimum when the liquid is being withdrawn from the tank.

7. The combination with a tank from which liquid is to be withdrawn and provided with a filling opening, of a pressure chamber in which air is confined by said liquid, an indicating device connected with said chamber and responsive to the varying head of said liquid, and a movable pressure chamber adapted to be positioned for cooperation with said first pressure chamber and in which movable chamber when so positioned the air is confined by said liquid.

8. The combination with a tank from which liquid is to be withdrawn and provided with a filling opening, of a pressure chamber adapted to entrap air in said liquid above a predetermined level therein, an indicating device connected with said chamber and responsive to the varying head of said liquid, and a movable pressure chamber adapted to be placed over said first pressure chamber in order to cause said liquid to confine the air in both chambers below said predetermined level.

9. The combination with a tank from which liquid is to be withdrawn and provided with a filling opening, of a pressure chamber in which air is confined by said liquid at a predetermined level, an indicating device connected with said chamber and responsive to the varying head of said liquid, a second pressure chamber adapted to be placed over said first pressure chamber in order to cause said liquid to confine the air in both chambers at a still lower level, and means for moving said second chamber to expose the same to the atmosphere.

LEWIS A. MAPEL.